(12) United States Patent
Mounzer et al.

(10) Patent No.: US 10,361,897 B2
(45) Date of Patent: Jul. 23, 2019

(54) PEAK-TO-AVERAGE POWER RATIO REDUCTION IN A MULTI-CARRIER SIGNAL

(71) Applicants: Institut National Des Sciences Appliquees (INSA), Rennes (FR); American University of Beirut, Beirut (LB)

(72) Inventors: Ralph Mounzer, Maten (LB); Matthieu Crussiere, Laille (FR); Jean-Francois Helard, Rennes (FR); Youssef Nasser, Hadath (LB)

(73) Assignees: INSTITUT NATIONAL DES SCIENCES APPLIQUEES, Rennes (FR); AMERICAN UNIVERSITY OF BEIRUT, Beirut (LB)

( * ) Notice: Subject to any disclaimer, the term of this patent is extended or adjusted under 35 U.S.C. 154(b) by 0 days.

(21) Appl. No.: 15/572,054

(22) PCT Filed: May 3, 2016

(86) PCT No.: PCT/EP2016/059947
§ 371 (c)(1),
(2) Date: Nov. 6, 2017

(87) PCT Pub. No.: WO2016/177757
PCT Pub. Date: Nov. 10, 2016

(65) Prior Publication Data
US 2018/0123851 A1    May 3, 2018

(30) Foreign Application Priority Data
May 6, 2015 (FR) .................... 15 54085

(51) Int. Cl.
*H04L 5/00* (2006.01)
*H04L 27/26* (2006.01)
*H04J 13/00* (2011.01)

(52) U.S. Cl.
CPC ........ *H04L 27/2618* (2013.01); *H04J 13/004* (2013.01); *H04L 5/0021* (2013.01); *H04L 27/2615* (2013.01); *H04L 27/2634* (2013.01)

(58) Field of Classification Search
CPC .............. H04L 27/2618; H04L 5/0021; H04L 27/2615; H04L 27/2634; H04J 13/004
See application file for complete search history.

(56) References Cited

U.S. PATENT DOCUMENTS 7,292,639 B1 * 11/2007 Demirekler ......... H04L 27/2614
375/260
8,098,713 B2 * 1/2012 Baxley ..................... H04B 1/59
370/500

(Continued)

FOREIGN PATENT DOCUMENTS

CN       104144140 A    11/2014

OTHER PUBLICATIONS

International Search Report dated May 31, 2016 for corresponding International Application No. PCT/EP2016/059947 filed May 3, 2015.

(Continued)

*Primary Examiner* — Janice N Tieu
(74) *Attorney, Agent, or Firm* — David D. Brush; Westman, Champlin & Koehler, P.A.

(57) ABSTRACT

A method of transmitting a multi-carrier source signal, including symbols constituted by reserved carriers and data carriers. The method includes generating an additional signal that reduces peak-to-average power ratio of the signal to be transmitted. For each symbol, the method obtains M time samples representing the symbols and/or at least one iteration of: detecting P time samples from among P time samples representing the symbol, the P samples being the P samples of the highest amplitude among the M samples, or the P samples presenting a power value above a threshold;

(Continued)

Figure 1:
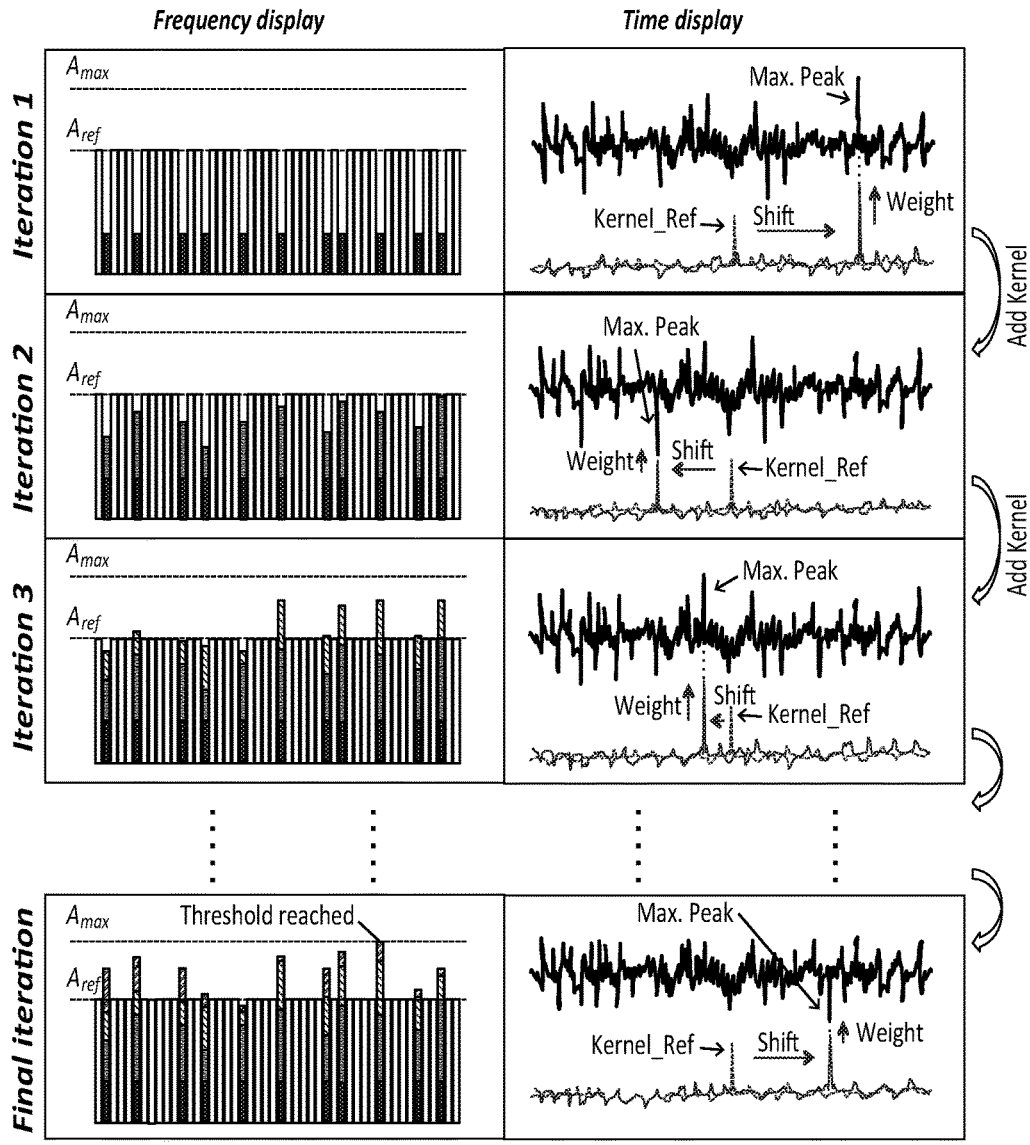

in the frequency domain, activating a reserved carrier, by addition of a pre-determined power to the reserved carrier; and for each activated reserved carrier: obtaining M time samples representing the activated reserved carrier, and applying a phase shift, taking account of the P detected samples, to the M time samples representing the activated reserved carrier.

9 Claims, 9 Drawing Sheets

(56) References Cited

U.S. PATENT DOCUMENTS

| | | | | |
|---|---|---|---|---|
| 2005/0089109 | A1* | 4/2005 | Yun | H04L 27/2618 375/260 |
| 2006/0140296 | A1* | 6/2006 | Cleveland | H04L 27/2618 375/260 |
| 2007/0116142 | A1* | 5/2007 | Molander | H04L 27/2624 375/260 |

OTHER PUBLICATIONS

Written Opinion of the International Searching Authority dated May 31, 2016 for corresponding International Applicatio No. PCT/EP2016/059947 filed May 3, 2015.

Pisit Boonsrimuang et al. "Proposal of Simple PAPR Reduction Method for OFDM Signal by Using Dummy Sub-Carriers." IEICE Transactions on Communications, Communications Society. Published Mar. 1, 2008.

Y. Z. Jiao et al. "A Novel Tone Reservation Scheme with Fast Convergence for PAPR Reduction in OFDM Systems." Consumer Communications and Networking Conference. Published Jan. 1, 2008.

Mohamad Mroue et al. "Performance and Implementation Evaluation of TR PAPR Reduction Methods for DVB-T2." International Journal of Digital Multimedia Broadcasting. Published Aug. 26, 2010.

* cited by examiner

PEAK-TO-AVERAGE POWER RATIO REDUCTION IN A MULTI-CARRIER SIGNAL

CROSS-REFERENCE TO RELATED APPLICATIONS

This Application is a Section 371 National Stage Application of International Application No. PCT/EP2016/059947, filed May 3, 2016, which is incorporated by reference in its entirety and published as WO 2016/177757 A1 on Nov. 10, 2016, not in English.

1. FIELD OF THE INVENTION

The field of the invention is that of the transmission of digital signals for which a multi-carrier modulation, especially of the OFDM (Orthogonal Frequency Division Multiplex) type, is used.

More specifically, OFDM modulation is increasingly being used for digital transmission, especially on multiple-path transmission channels. This multi-carrier modulation technique is used especially to overcome inter-symbol interference generally observed when using multi-carrier modulation on a multipath channel. In addition, this technique has very high spectral efficiency and brings savings in radio spectral resources through the implementing of single-frequency networks.

Because of its intrinsic robustness in frequency-selective channels, OFDM modulation is especially but not exclusively used in local wireless networks (WiFi or WiMAX networks), the 3GPP, LTE or advanced LTE (Third Generation Partnership Project or Long Term Evolution), or again the ADSL (Asymmetric Digital Subscriber Line) and Hiperlan/2 (High PErformance Radio Local Area Network) mobile cellular radiotelephony as well as for standards such as those relating to digital audio broadcasting (DAB), digital video broadcasting (DVB), especially DVB-T (terrestrial digital television standard) DBV-T2, DVB-NGH (DVB-Next Generation Handheld, a standard for the broadcasting of digital terrestrial television used on mobile terminals), or again the future digital television standard known as at the ATSC 3.0 intended to offer an immersive audio experience for drawing rooms and mobile television audiences and proposed by the American Advanced Television Systems Committee (ASTC).

2. PRIOR ART 2.1 Drawbacks of OFDM Modulation

One major drawback of the OFDM technique is inherent in the high fluctuations in amplitude of the envelope of the modulated signal and therefore major variations in instantaneous power.

The fact is that, in the time domain, the summing of these independently modulated, multiple carriers is done in terms of power for most of the time but also consistently. This leads to instantaneous power peaks that can surpass the average power of the signal by more than 10 dB at certain instants.

The peak-to-average power ratio (PAPR) of the signals sent is thus generally very high and increases with the number of carriers N.

Power amplifiers have non-linear characteristics which, coupled with the amplification of the signals called high PAPR signals, lead to distortions: spectral regrowth of the level of the side lobes, the generation of harmonics, creation of non-linear inter-symbol interference, the creation of inter-carrier interference. Thus, these distortions lead especially to errors of transmission and to a deterioration of the binary error rate (BER).

2.2 Prior Art for the Reduction of PAPR

In the literature, numerous techniques have already been proposed to overcome this problem.

A common solution consists in making sure that the operating range of the amplifier remains limited to a linear amplifier zone. This unfortunately limits the yield of the amplifier (a few percent instead of the classic 50%) and therefore to a major increase in the consumption of the transmitter. This is a great constraint for the use of OFDM, especially in high-power transmitters such as digital television broadcasting stations and base stations for cell networks given that the consumption of the power amplifier can amount to more than 50% of the energy spent by the transmitter to perform the service.

A second approach is called selected mapping. In this approach, a phase rotation is applied to each symbol of the sequence to be transmitted. Several phase rotation patterns can be defined. For each pattern applied to the sequence to be transmitted, operations are performed to obtain a corresponding OFDM signal and the one having the lowest PAPR is transmitted. Again, this technique does not bring any distortion but requires that the rotation sequence used when sending should be communicated to the receiver of the rotation sequence with very high reliability. This reduces spectral efficiency and significantly increases the complexity of the system for conveying the order number of the pattern used through a dedicated channel. In addition, if this transmission is erroneous, then the entire OFDM frame will be lost. This approach also increases complexity when sending since several processing operations have to be performed in parallel in order to then select the most efficient one. The other processing operations would have been carried out unnecessarily, and would not be exploited.

A third approach, commonly called the ACE (Active Constellation Extension) technique is based on a modification of constellations and relies on a shift made towards a greater distance from the decision axes. However, this technique is characterized by lower efficiency for high-order constellations and increases in the average power of the signal and by a very high complexity of computation.

A fourth approach is based on an addition of signals to reduce the PAPR. More specifically, the added signal shows amplitude peaks in phase opposition with those of the signal to be corrected.

The "clipping" technique, which consists in clipping the amplitude of the signal when it goes beyond a pre-determined threshold, is also a signal-adding method. Indeed, "clipping" consists in eliminating the signal. However, such elimination is mathematically equivalent to adding a corrective signal.

However, this clipping is by nature non-linear and introduces a distortion of the signal sent resulting not only in lower BER but also in a regrowth of the side lobes of the power spectral density (SPD).

Another signal-adding technique signals, commonly called the "TR" (Tone Reservation) technique, proposes to reserve certain OFDM multiplex carriers that do not transport information but symbols optimized when sending to reduce the PAPR. The optimization of these symbols can be done by using, for example, a convex optimizing algorithm of the SOCP (Second Order Cone Programming) type. This technique does not provide any distortion to the signal sent. However, one major drawback of this method lies in the fact that a certain number of carriers must be reserved in order to be able to reduce the PAPR significantly. These carriers are not used to send useful information data. This leads to a reduction of the spectral efficiency.

Among the TR (Tone Reservation) techniques that are known, there is especially the TR gradient-based technique illustrated in FIG. 1, the implementation of which has been chosen for example, for the DVB-T2 and DVB-NGH standards.

This technique is iterative and, at each iteration, it seeks to cancel out only one of the instantaneous power peaks present within the signal to be transmitted. To this end, this gradient-based technique represented in FIG. 1 builds a time impulse-like "core", here below called a "kernel", from the set of reserved carriers and shifts this kernel into the time domain so that it has the same time location as the power peak that it seeks to reduce.

However, the efficiency of such a technique is limited by its convergence which is slow and hard to predict or control. Indeed, certain iterations can have an effect that is more destructive than positive on the effective reduction of the PAPR.

In addition, this technique does not enable optimum control of the power transmitted on each reserved carrier so much so that this iterative method can be interrupted even before convergence when the power transmitted on one of the reserved carriers goes beyond an authorized maximum value. Indeed, according to the DVB-T2 and DVB-NGH standards, the power transmitted on the reserved carriers cannot, in particular, surpass the power transmitted on the carriers carrying payload data by more than 10 dB.

With regard to this aspect, one variant of this method has been proposed in M. Mroué et al., "Performance and Implementation Evaluation of TR PAPR Reductions Methods for DVB-T2", International Journal of Digital Multimedia Broadcasting, Vol. 2010, Article ID 797393, 10 pages http://dx.doi.org/10.1155/2010/797393.

Figure 2:
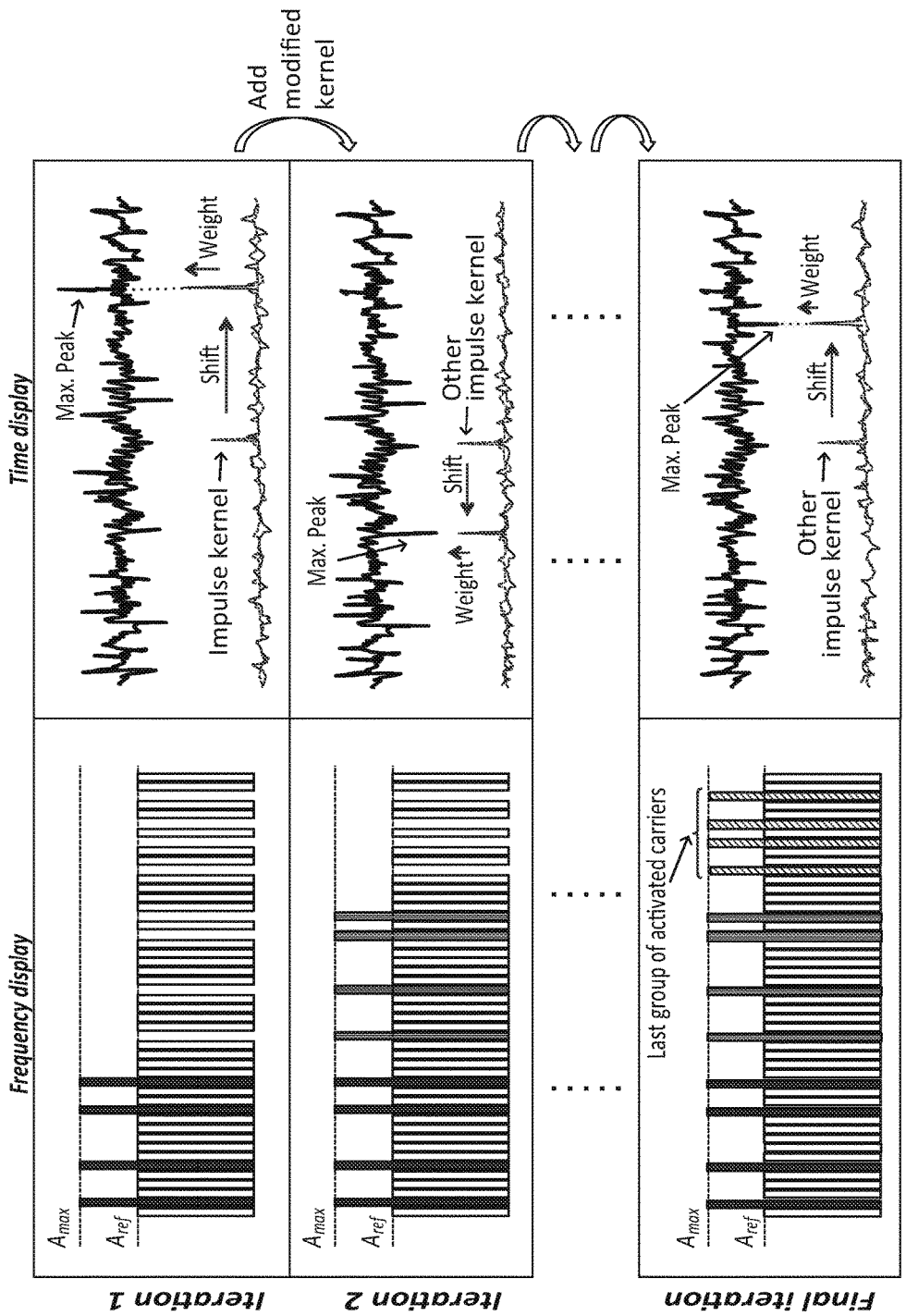
Figure 5:
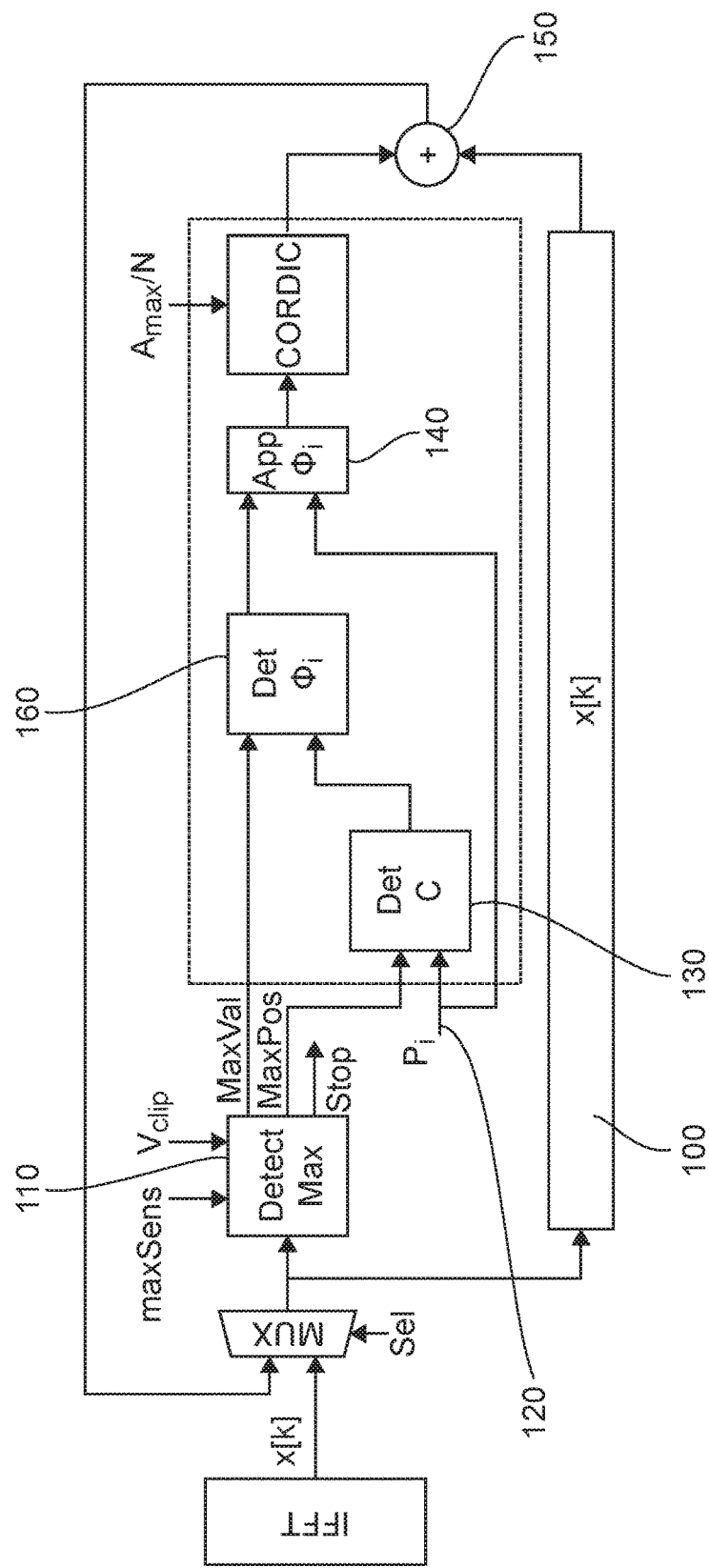

According to this variant, called the TR-OKOP (Tone Reservation One Kernel One Peak) illustrated in FIG. 5, the reserved carriers are distributed into groups. On the basis solely of the carriers reserved for one and the same group, a time impulse-like kernel, as shown in FIG. 2, is generated in order to reduce, in the course of one iteration, only one of the instantaneous power peaks in a highly localized time position.

This technique therefore limits the number of iterations to the number of groups of carriers implemented while at the same time controlling, at each iteration, an average power transmitted on all the reserved carriers of the group considered.

However, just like the gradient-based method implemented according to DVB-T2, such a technique has limited efficiency. Indeed, these techniques only enable a reduction of one power peak at each iteration. Certain iterations could have the effect of reducing the power peak being targeted but are harmful towards to the previously reduced peaks.

Besides, while the TR-OKOP does enable control of the power transmitted to a group of carriers, it does not in any way enabling a precise optimization of the power transmitted to each carrier.

In this particular context, the inventors have identified a need for a novel technique to improve PAPR reduction while at the same time limiting complexity of implementation.

3. SUMMARY OF THE INVENTION

The invention proposes a novel solution that does not have all these drawbacks of the prior art in the form of a method of transmission of a multi-carrier source signal comprising symbols constituted by a set of carriers, intended to be sent out simultaneously and comprising carriers reserved for at least one processing operation for reducing the peak-to-average power ratio of said source signal, and data carriers, said method comprising the following steps:
generation of an additional signal and addition to said source signal of said additional signal, delivering an optimized signal having a peak-to-average power ratio smaller than the peak-to-average power ratio of said source signal,
transmission of said optimized signal.

According to the invention, said step of generation and addition of an additional signal comprises, for each symbol of said source signal, a step for obtaining M time samples representing said symbols and/or at least one iteration of the following steps:
detection of P time samples from among said P time samples representing said symbol, said P samples being the P samples of the highest amplitude among said M samples, or said P samples having a power value above a pre-determined threshold,
in the frequency domain, activation of at least one of said reserved carriers of said symbol, by the addition of a pre-determined power to said at least one of said reserved carriers,
for each activated reserved carrier:
obtaining M time samples representing said activated reserved carrier,
applying a phase shift, taking account of said P detected samples, to said M time samples representing said activated reserved carrier, delivering M time samples representing an additional signal associated with said activated reserved carrier,
adding the M time samples representing said additional signal associated with said activated reserved carrier to said M time samples representing said symbol, delivering M time samples representing said symbol to be used for the detection step of the next iteration.

The invention thus proposes a novel technique of transmission of a signal, aimed at improving the carrier reservation technique commonly called the "TR technique" (Tone Reservation technique), the positioning of the reserved carriers in the time-frequency space being known to the receiver or receivers. Indeed, unlike in the prior art TR techniques aimed at reducing only the amplitude of a single peak by iteration, the present invention proposes to reduce the peak-to-average power ratio (PAPR) with greater efficiency by reducing several amplitude peaks at a time at each iteration.

Just as in the case of the other prior-art TR techniques, the present invention requires no particular implementation on the receiver side. Indeed, the receiver processes only the data carriers and overlooks the reserved carriers of which it needs to know only the location in the time-frequency space, this location being generally specified in the frequency grid of the transmission standard implemented.

In the particular case where only one reserved carrier is activated per iteration, this approach can be qualified by the expression "one reserved carrier activated to reduce a plurality of peaks simultaneously" and has been named "Solo TR" by the inventor or again "ICMP" (Individual Carrier Allocation for Multiple Peaks).

To this end, the present invention first of all implements a step for detecting the plurality of amplitude peaks to be reduced among the time samples representing the symbol considered. It must be noted that the method considers the amplitude in absolute value of these peaks.

According to a first alternative, for a given symbol, these peaks correspond to the P time samples having an amplitude that is the highest among M time samples representing the signal. In this first case, the present invention seeks to reduce an identical number of peaks for each symbol, this number P being pre-determined, for example by an operator.

According to a second alternative, these peaks are the P samples having power greater than a pre-determined threshold. In this second case, the number of peaks to be reduced can therefore vary from one symbol to another.

Depending on the operator's requirements or on transmission scenarios, an optimal value of the number P in the case of the first alterative, or an optimal value of the thresholds in the case of the second alternative, is determined so as to obtain the desired performance. For example, when we consider the 32 k mode introduced into the DVB-T2 standard where N=288 reserved carriers, a number P of the order of 100 (for example ranging from 90 to 110) enables the desired transmission performance to be achieved.

Then, in the frequency domain, at least one of said reserved carriers of said symbol is activated by the addition of a pre-determined power to each of said reserved carriers.

For example, if we consider the DVB-T2 standard, this pre-selected power when added cannot exceed 10 dB. In order to limit the power consumed during the implementing of the method according to the invention, this added power will for example, be of the order of 5 dB or could be optimized individually for each reserved carrier activated at each iteration.

Thus the present invention can be used to achieve a reduction of a plurality of amplitude peaks of a symbol by iteration and, at the same time, perfect control over the power added on each reserved carrier, which is not the case in the prior art solutions.

Then, for each activated reserved carrier, M time samples representing said activated reserved carrier are obtained. In other words, the obtaining for each activated reserve carrier of these M time samples representing said activated reserved carrier is simple and rapidly computed (using a simple exponential function) because it means assuming that all the other carriers are set at zero and that a pre-determined power is added to only one of the reserved carriers for each iteration.

In addition, the present invention applies a phase shift taking account of said P detected samples to said M time samples representing said activated reserved carrier, delivering M time samples representing an additional signal associated with said activated reserved carrier.

In other words, the purpose of this step is to use an optimized phase shift so that values of amplitude taken by the time impulse comb at the positions of the P peaks detected (comprehensively) reduce the values of amplitude taken by all these P peaks, the time impulse comb corresponding to the activation, in the form of a frequency pulse, of each activated reserved carrier.

Once this phase shift is obtained, the M time samples representing said additional signal associated with said activated reserved carrier are added to said M time samples representing said symbol, delivering M time samples representing said symbol to be used for the detection step of the next iteration.

It must be noted that, according to the present invention, the "addition" can be equivalent to addition and/or deduction so as to obtain an optimized signal, for which the absolute value of the peaks is smaller than that of said source signal.

This present invention therefore uses at least one frequency impulse per iteration to reduce several time amplitude peaks distributed on an entire OFDM symbol, such a frequency impulse being equivalent to a time impulse comb. On the contrary, the prior-art TR techniques produce a time impulse-like kernel that can reduce only one peak at a time and not a plurality of peaks simultaneously.

It must be noted that, for each iteration, the three steps of obtaining, applying and adding are implemented respectively for each activated reserved carrier.

According to one particular aspect of the present invention, each reserved carrier is activated only once during said step for generating an additional signal.

Thus, the number of iterations is limited and smaller than or equal to the number of reserved carriers for the reduction of the PAPR, thus enabling better control of the reduction of the PAPR as compared with the prior-art methods for which convergence is very difficult to predict or control.

Besides, such a use of each reserved carrier to act on a plurality of peaks makes it possible to limit the fact that certain iterations have an effect which is more destructive than positive on the development of the PAPR. Indeed, the present invention provides for a more continuous reduction of the PAPR during each iteration because several peaks are reduced simultaneously.

In one embodiment of the transmission method, said phase shift takes account of both the amplitude of said P detected samples and the amplitude of the P samples, having a same position as said detected P samples, belonging to said M time samples representing said at least one activated reserved carrier.

It must be noted that the amplitude is considered in terms of absolute value, for the P peaks of the M time samples representing said symbol.

According to one particular aspect of this embodiment, said phase shift is defined by the following equation in the discrete time domain:

$$\phi = \frac{3\pi}{2} + \arctan\left(\frac{\sum_{v \in maxPos} \text{Re}(x[v]) \cdot \text{Re}(c[v]) + \text{Im}(x[v]) \cdot \text{Im}(c[v])}{\sum_{v \in maxPos} \text{Im}(x[v]) \cdot \text{Re}(c[v]) - \text{Re}(x[v]) \cdot \text{Im}(c[v])}\right)$$

with:
x being said source signal,
maxPos represents all the positions of said P detected samples and v is one of said positions,
c being the signal representing said activated reserved carrier.

According to another embodiment of the method of transmission, at least two reserved carriers of said symbol are activated simultaneously.

This embodiment seeks to activate several reserved carriers at a time. In other words, if we consider N reserved carriers per symbol to be transmitted, the N reserved carriers are then distributed among G groups of A carriers such that N=G.A, with A≥2 and G<N.

All the same, it must be noted that the three steps for obtaining, applying and addition are implemented respectively for each reserved carrier activated during the iteration considered. In other words, the Solo TR approach, where a single reserved carrier is activated per iteration, is carried out in a "grouped" manner (i.e. A=1 and G=N). This is why the inventors have called this embodiment the "Grouped Solo TR" or again the GICMP (Grouped Individual Carrier Allocation for Multiple Peaks).

The number of iterations is therefore equal to the number of groups G and therefore smaller than the number N of reserved carriers, thus making it possible to reduce the time of implementation of the method according to the invention, especially when we consider the 32 k mode introduced into the DVB-T2 standard where N=288 reserved carriers.

According to one particular aspect of this embodiment, a step for determining phase shift is implemented for each of said at least two simultaneously activated reserved carriers.

In other words, according to this particular aspect, for each reserved carrier activated during the iteration considered, a step for determining the phase shift is implemented, and there are therefore as many steps for determining a phase shift as the number A of carriers activated per iteration.

According to another particular aspect of this embodiment, a single step for determining said phase shift is implemented for said at least two simultaneously activated reserved carriers,
said step for determining said phase shift being preceded by a step for adding M time samples obtained respectively for each of said at least two simultaneously activated reserved carriers.

In other words, according to this particular aspect, the three steps for obtaining, applying and addition are implemented respectively for each reserved carrier activated, but a same phase-shift value is applied to each.

This particular aspect is of course less precise in terms of correction, but enables a reduction in the complexity related to the implementation of one phase-shift determining operation per activated reserved carrier.

The invention also relates to a device for transmitting a multi-carrier source signal comprising symbols constituted by a set of carriers that are to be sent out simultaneously, and comprising carriers reserved for at least one processing operation to reduce the peak-to-average power ratio of said source signal, and data carriers, said device comprising:
  a module for the generation of an additional signal and the addition to said source signal of said additional signal, delivering an optimized signal having a peak-to-average power ratio smaller than the peak-to-average power ratio of said source signal,
  a module for the transmission of said optimized signal.

Said module for the generation and addition of an additional signal is remarkable in that it comprises, for each symbol of said source signal, an entity for obtaining M time samples representing said symbol, and further comprises:
  an entity for detecting P time samples among said M time samples representing said symbol, said P samples being the P samples of highest amplitude among said M samples, or said P samples presenting power above a pre-determined threshold,
  an entity for activating at least one of said reserved carriers of said symbol, by addition of a pre-determined power value to said at least one of said reserved carriers,
  for each activated reserved carrier:
    an entity for obtaining M time samples representing said activated reserved carrier,
    an entity for applying a phase shift, taking account of said P detected samples, to said M time samples representing said activated reserved carrier, delivering M time samples representing an additional signal associated with said activated reserved carrier,
    an entity for the addition of M time samples, representing said additional signal associated with said activated reserved carrier, to said M time samples representing said symbol, delivering M time samples representing said symbol to be used for the detection step of the following iteration.

Such a device is especially suited to implementing the method of transmission as described here above, the entities of the module for the generation of an additional signal being implemented at each iteration of this method.

This device could of course comprise the different characteristics relating to the method of transmission as described here above which can be combined or taken in isolation. Thus, the characteristics and advantages of this transmission device are the same as those of the method of transmission described here above. They are therefore not described in ampler detail.

Another aspect of the invention also relates to a signal representing a signal transmitted according to the method of transmission described here above. Such a signal can be transmitted and/or stored on a data medium.

This signal could naturally comprise the different characteristics of the method of transmission according to the invention.

According to one implementation, the different steps of the method of transmission as described here above are implemented by one or more software programs or software modules comprising software instructions to be executed by a data processor of a transmission device designed to command the execution of different steps of the method according to the invention.

The invention is therefore also aimed at providing a computer program, capable of being executed by a computer or by a data processor, this program comprising instructions to command the execution of the steps of a method of transmission as mentioned here above.

This program can use any programming language whatsoever and be in the form of source code, object code or intermediate code between source code and object code such as in a partially compiled form or in any other desirable form whatsoever.

The proposed technique is also aimed at providing an information carrier readable by a data processor and comprising instructions of a program as mentioned here above.

The information carrier can be any entity or communications terminal whatsoever capable of storing the program. For example, the carrier can comprise a storage means such as a ROM, for example, a CD ROM or microelectronic circuit ROM (USB stick, SSD) or again a magnetic recording means, for example a floppy disk or a hard disk drive.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more software module programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc.

4. LIST OF FIGURES

Figure 3:
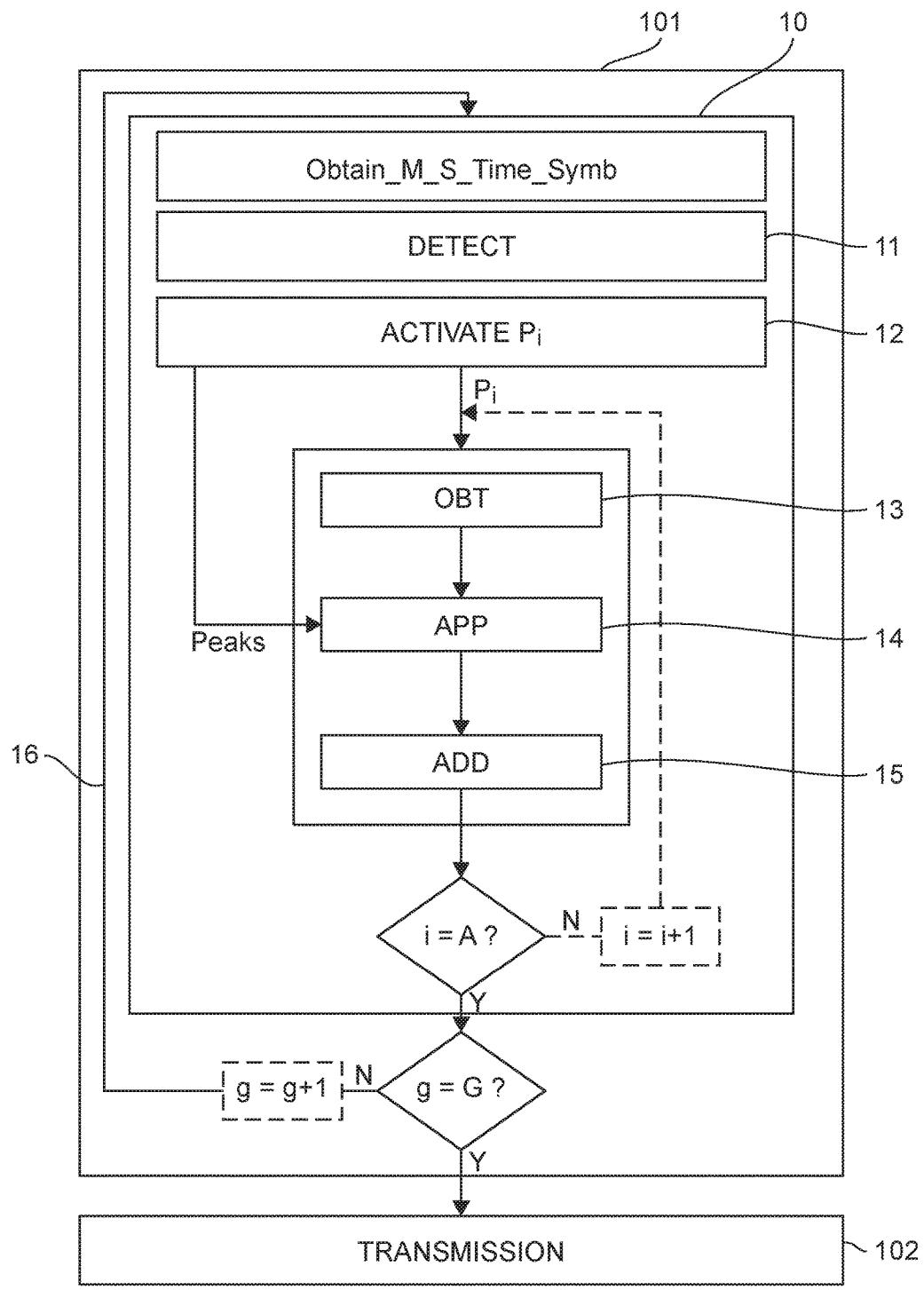

Other features and advantages of the invention shall appear more clearly from the following description of a preferred embodiment, given by way of a simple illustratory and non-exhaustive example and from the appended drawings, of which FIGS. 1 and 2, already described with reference to the prior art, illustrate the TR techniques for reducing PAPR, FIG. 3 presents the main steps of the method of transmission according to the invention, FIGS. 4 and 5 respectively illustrate a method and a device according to a first embodiment of the invention, called "Solo TR", FIGS. 6 and 7 respectively illustrate a method and a device according to a first variant of a second embodiment of the invention called "Grouped Solo TR", FIGS. 8 and 9 respectively illustrate a method and a device according to a second variant of a second embodiment of the invention, called "Grouped Solo TR".

5. DESCRIPTION OF ONE EMBODIMENT OF THE INVENTION

5.1 General Principle

The general principle of the invention is based on the activation of at least one reserved carrier per iteration, in adding to it a pre-determined level of power relative to the data carriers.

Such an activation, corresponding to a frequency impulse, generates an impulse comb in the time domain so as to simultaneously reduce a plurality of power peaks of a symbol of the signal to be transmitted.

To this end, a phase shift taking account of these power peaks is applied to the impulse comb created. Such a phase shift makes it possible, during a step of addition (i.e. subtraction) to make the amplitude-reducing impulse comb coincide in position with the plurality of power peaks of the symbol of the signal to be transmitted.

Here below, referring to FIG. 3, a description is provided of the general steps of the method of transmission according to the invention.

The method according to the invention comprises chiefly the following steps:
generation 101 of an additional signal, and addition to said source signal of said additional signal, delivering an optimized signal having a peak-to-average-power ratio smaller than the peak-to-average-power ratio of said source signal, transmission 102 of said optimized signal.

In particular, said step for generating and adding (101) an additional signal comprises, for each symbol of said source signal, a step (10) for obtaining M time samples representing said symbol and at least one iteration (16) of the following steps:

detection (11) of P time samples among said M time samples representing said symbol, said P samples being the P samples of the highest amplitude among said M samples, or said P samples presenting power above a pre-determined threshold, in the frequency domain, activation (12) of at least one of said reserved carriers of said symbol by the addition of a pre-determined power to said at least one of said reserved carriers, for each activated reserved carrier per iteration (16):
obtaining (13) of M time samples representing said activated reserved carrier,
applying (14) of phase shift, taking account of said P detected samples, to said M time samples representing said activated reserved carrier, delivering M time samples representing an additional signal associated with said activated reserved carrier,
addition (15) of the M time samples representing said additional signal associated with said activated reserved carrier to said M time samples representing said symbol, delivering M time samples representing said symbol to be used for the detection step of the next iteration.

Each of these main steps is described in detail here below for different embodiments of the invention.

5.2 Description of a First Embodiment According to the Invention

Figure 4:
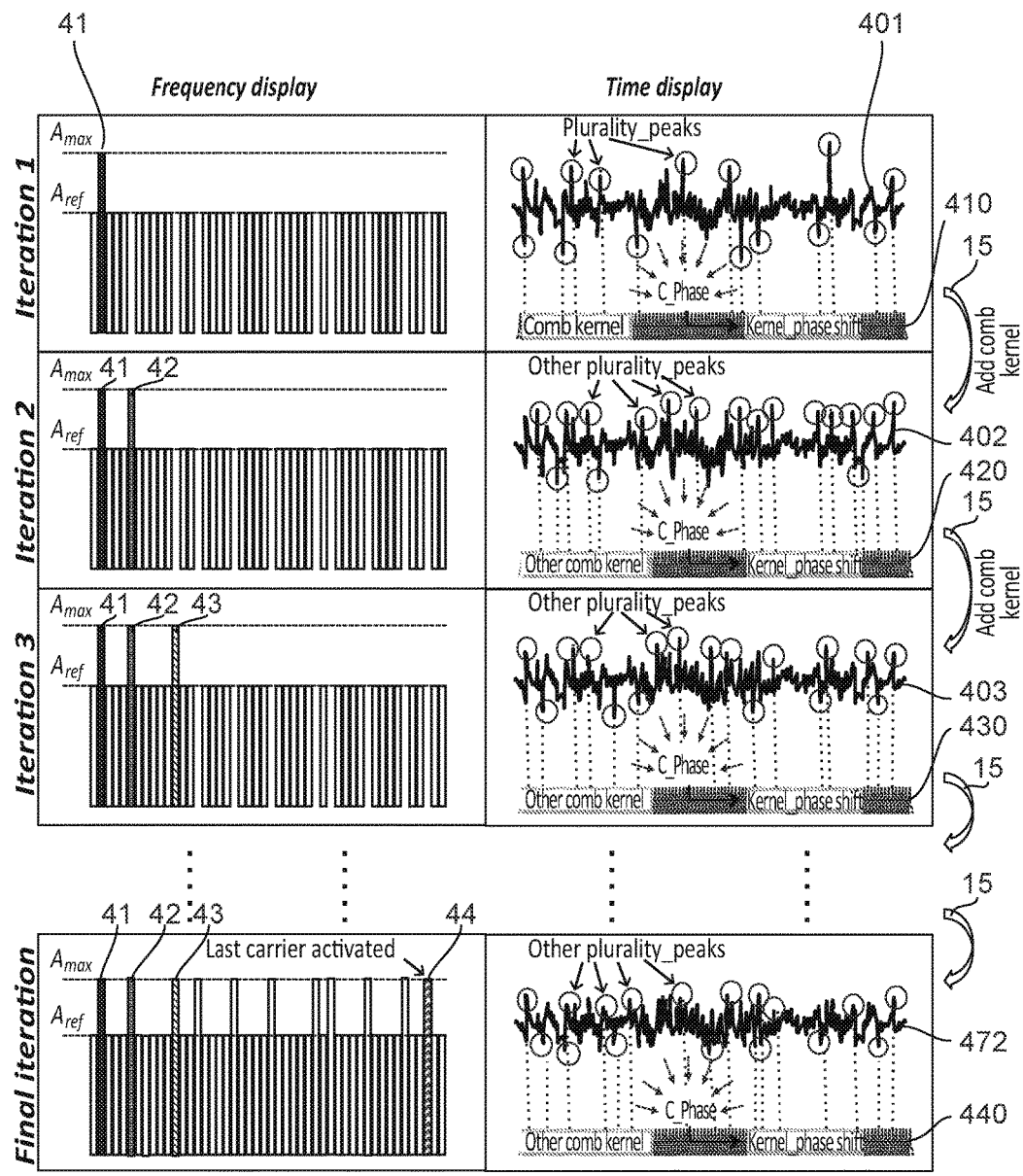

Referring to FIGS. 3 to 5, we present a first embodiment of the invention that the inventors have named as "Solo TR" or again ICMP (Individual Carrier Allocation for Multiple Peaks).

This first embodiment corresponds to the particular case where only one reserved carrier is activated per iteration, the activated reserved carrier differing from one iteration to the other so that a reserved carrier is activated only once per symbol during the implementation of the method of transmission according to the invention.

In other words, G=N groups of A=1 carrier are processed for a symbol to be transmitted according to the method of transmission of the present invention.

The frequency display (to the left) and the time display (to the right) of the first three iterations (g=1, 2 and 3) and the $N^{th}$ iteration of this first embodiment are represented in FIG. 4.

For a given symbol to be transmitted, the M time samples (401) representing the symbol are first of all obtained 10 and memorized, for example in a buffer memory of an obtaining entity 100 as shown in FIG. 5 illustrating the device implementing an iteration of this first embodiment to the method of transmission according to the invention, the modules and entities of which are driven by a processor (not shown) of a processing unit (not shown), itself driven by a computer program (not shown) stored in a memory (not shown) and implementing the method of transmission according to the invention.

These time samples (401) are for example, directly provided by an operator, or preliminarily memorized, or again they come from the implementation of an Inverse Fast Fourier Transform (IFFT), the IFFT operator being time multiplexed with the other entities (100 to 160) of the module for generating and adding an additional PAPR-reducing signal according to the invention.

Then, during the first iteration of an index g=1, among these M time samples (401) representing the symbol considered, the P samples having the highest amplitude (their number is especially defined by the parameter maxSens), or the P samples having power above a pre-determined threshold Vclip (the number of peaks to be reduced can in this case also vary from one symbol to another) are detected 11 by the detection entity 110 as represented in FIG. 5.

These P samples correspond to the plurality of peaks encircled in the time display of the first iteration.

During the first iteration of this first embodiment, the first reserved carrier $P_g$ (with g=1) 41 is activated (12) by the addition of a pre-determined power value defined by an operator. For example, this power value is greater than the power $A_{ref}$ of the data carriers by $A_{max}$=5 dB.

The activation 12 of this carrier is equivalent to applying a frequency impulse. The M time samples 410 representing this activated reserved carrier 41 are obtained 13 by the obtaining entity 130 of FIG. 5, in assuming that all the other carriers are set at zero, and takes the form of an impulse comb that differs from the time impulse-like kernel implemented according to the TR techniques of the prior art as illustrated by FIGS. 1 and 2.

Such an obtaining entity 130 is especially formed by at least one multiplier and one CORDIC tool enabling a transformation of polar coordinates into two Cartesian coordinates by applying a "modulo π" if necessary.

Then, this impulse comb 410 is phase-shifted (14) so as to coincide in position and in inverse amplitude (i.e. amplitude in opposition to the amplitude of each peak) with the peaks previously detected 11 among the M time samples 401.

To this end, a phase shift is determined, by the determining entity 160 of FIG. 5, as follows:

$$\phi_{g=1} = \frac{3\pi}{2} + \arctan\left(\frac{\sum_{v \in maxPos} \mathrm{Re}(x_{g=1}[v]) \cdot \mathrm{Re}(c_{g=1}[v]) + \mathrm{Im}(x_{g=1}[v]) \cdot \mathrm{Im}(c_{g=1}[v])}{\sum_{v \in maxPos} \mathrm{Im}(x_{g=1}[v]) \cdot \mathrm{Re}(c_{g=1}[v]) - \mathrm{Re}(x_{g=1}[v]) \cdot \mathrm{Im}(c_{g=1}[v])}\right)$$

with:
$x_{g=1}$, being a time vector comprising the M samples representing the symbol during the first iteration (g=1),
maxPos all the positions of the P samples detected and v one of said positions during the first iteration (g=1),
$c_{g=1}$ a time vector comprising the M samples representing said reserved carrier activated during the first iteration (g=1) such that:

$$c_{g=1}[k] = \frac{A_{max}}{M} \cdot e^{j\frac{2\pi \cdot P_{g=1} \cdot k}{M}}, k \in [0, M-1]$$

with:
$P_{g=1}$ the position of the reserved carrier activated during this first iteration.

Such a determining entity 160 is especially formed by four multipliers and four adders/subtractors.

Such a phase shift therefore takes account of both the amplitude of the P samples detected x[v] among the M time samples (401) representing the symbol considered and the amplitude of the P samples c[v] of a same position (v among one of the positions maxPos) belonging to the M time samples 410 representing the activated reserved carrier 43.

The application (14) of the phase shift to the impulse comb is such that:

$$c_{g=1}[k]_d = \frac{A_{max}}{M} \cdot e^{-j\phi_{g=1}} \cdot e^{j\frac{2\pi \cdot P_{g=1} \cdot k}{M}}, k \in [0, M-1],$$

Once this impulse comb 410 is phase-shifted (it is also called a phase-shifted "comb kernel"), it is added, by the addition entity 150 of FIG. 5, to the M time samples 401 representing the symbol considered, delivering M new time samples $x_{g=2}[k]$ 402 representing the symbol to be used for the detection step 11 of the last iteration such that:

$$x_{g=2}[k] = x_{g=1}[k] + c_{g=1}[k]_d$$

During the second iteration indexed g=2 among these M new time samples $x_{g=2}[k]$ 402, P peaks are detected 11 as encircled in the time display of the second iteration.

It can be noted that the amplitudes of these peaks and their position have changed from the first iteration.

The second reserved carrier $P_{g=2}$ is then activated (12) (the first carrier activated continues to be represented in order to consider that it has already been activated), the M time samples 420 representing this activated reserved carrier 42 are obtained in assuming that all the other characters are set at zero and therefore takes the form of an impulse comb 420 that is different from the impulse comb 410 obtained during the first iteration.

In the same way as for the first iteration, a phase shift is applied to this impulse comb 420 so as to coincide in position and in inverse amplitude (i.e. amplitude in opposition to the amplitude of each P) with the previously detected peaks 11 among the new time samples 402.

This phase shift is determined similarly to the first iteration as follows:

$$\phi_{g=2} = \frac{3\pi}{2} + \arctan\left(\frac{\sum_{v \in maxPos} \mathrm{Re}(x_{g=2}[v]) \cdot \mathrm{Re}(c_{g=2}[v]) + \mathrm{Im}(x_{g=2}[v]) \cdot \mathrm{Im}(c_{g=2}[v])}{\sum_{v \in maxPos} \mathrm{Im}(x_{g=2}[v]) \cdot \mathrm{Re}(c_{g=2}[v]) - \mathrm{Re}(x_{g=2}[v]) \cdot \mathrm{Im}(c_{g=2}[v])}\right)$$

with:
$x_{g=2}$ being a time vector comprising M samples representing the symbol during the second iteration (g=2),
maxPos all the positions of the P samples detected and v one of said positions during the second iteration (g=2),
$c_{g=2}$ a time vector comprising the M samples representing said reserved carrier activated during the second iteration (g=2).

Once this impulse comb 420 is phase-shifted (it is also called a phase-shifted "comb kernel"), it is in turn added (15) to the M time samples 402 representing the symbol coming from the first iteration, delivering M new time samples 403 representing the symbol such that:

$$x_{g=3}[k] = x_{g=2}[k] + c_{g=2}[k]_d$$

to be used in the detection step 11 of the third iteration and so on and so forth up to the last reserved carrier 44 that has not yet been activated.

During this last iteration indexed g=N (for example N=72 for the 8 K mode of the DVB-T2 and DVB-NGH standards), among these M new time samples $x_{g=N}[k]$ 472, P peaks are detected 11 as encircled in the time display of the last iteration.

It can be noted that the amplitudes of these peaks and their position have also changed from the first iteration, and that the amplitude of the peaks has especially been reduced during the operation.

The last reserved carrier $P_g$ (with g=N=72 for example) 44 is then activated (12), the M time samples 440 representing this activated reserved carrier 44 are obtained, in assuming that all the other carriers are set at zero, and therefore takes the form of an impulse comb 440 that is different from the impulse comb 410 obtained during the first iteration.

In the same way as for the first iteration, a phase shift is applied to this impulse comb 440 so as to coincide in position and inverse amplitude (i.e. amplitude in opposition to amplitude of each peak) with the previously detected peaks 11 among the time samples 472 coming from the second last iteration.

Once this impulse comb 440 has been phase-shifted (it is also known as a phase-shifted "comb kernel") it is in turn added (15) to the M time samples 472 representing the symbol coming from the second-last iteration, delivering M new time samples (not shown) to be transmitted.

According to this embodiment, there will therefore have been as many iterations as there are reserved carriers.

Thus, if we consider the 2 K mode (18 reserved carriers), the 4 K mode (36 reserved carriers) or the 8 K mode (72 reserved carriers) of the DVB-T2 and DVB-NGH standards, there will therefore be respectively 18, 36 and 72 iterations. This is acceptable in terms of performance.

By contrast, the 32 K mode with 288 reserved carriers requires 288 iterations, which can lead to excessively lengthy computation time and/or require excessive hardware resources. The second embodiment, described here below, is proposed as a solution for the latter case.

5.3 Description of a Second Embodiment According to the Invention

According to a second embodiment of the method of transmission, at least two reserved carriers of the symbol considered are activated simultaneously.

This embodiment is aimed at activating several reserved carriers at a time. In other words, if we connect N reserved carriers per symbol to be transmitted, the N reserved carriers are then divided among G groups of A carriers such that N=G.A with A≥2 and G<N.

All the same, it must be noted that the three steps of obtaining (13), applying (14) and adding (15) are respectively implemented for each carrier activated during the iteration considered. In other words, the "Solo TR" approach where only one reserved carrier is activated per iteration (i.e. A=1 and G=N) is carried out in a grouped manner. This is why the inventors have called this embodiment the "grouped solo TR" or again GICMP (Grouped Individual Carrier Allocation for Multiple Peaks).

The number of iterations is therefore equal to the number of groups G and therefore smaller than the number N of reserved carriers, thus reducing the time of implementation of the method according to the invention, especially when we consider the 32 K mode introduced into the DVB-T2 standard where N=288 reserved carriers.

Figure 6:
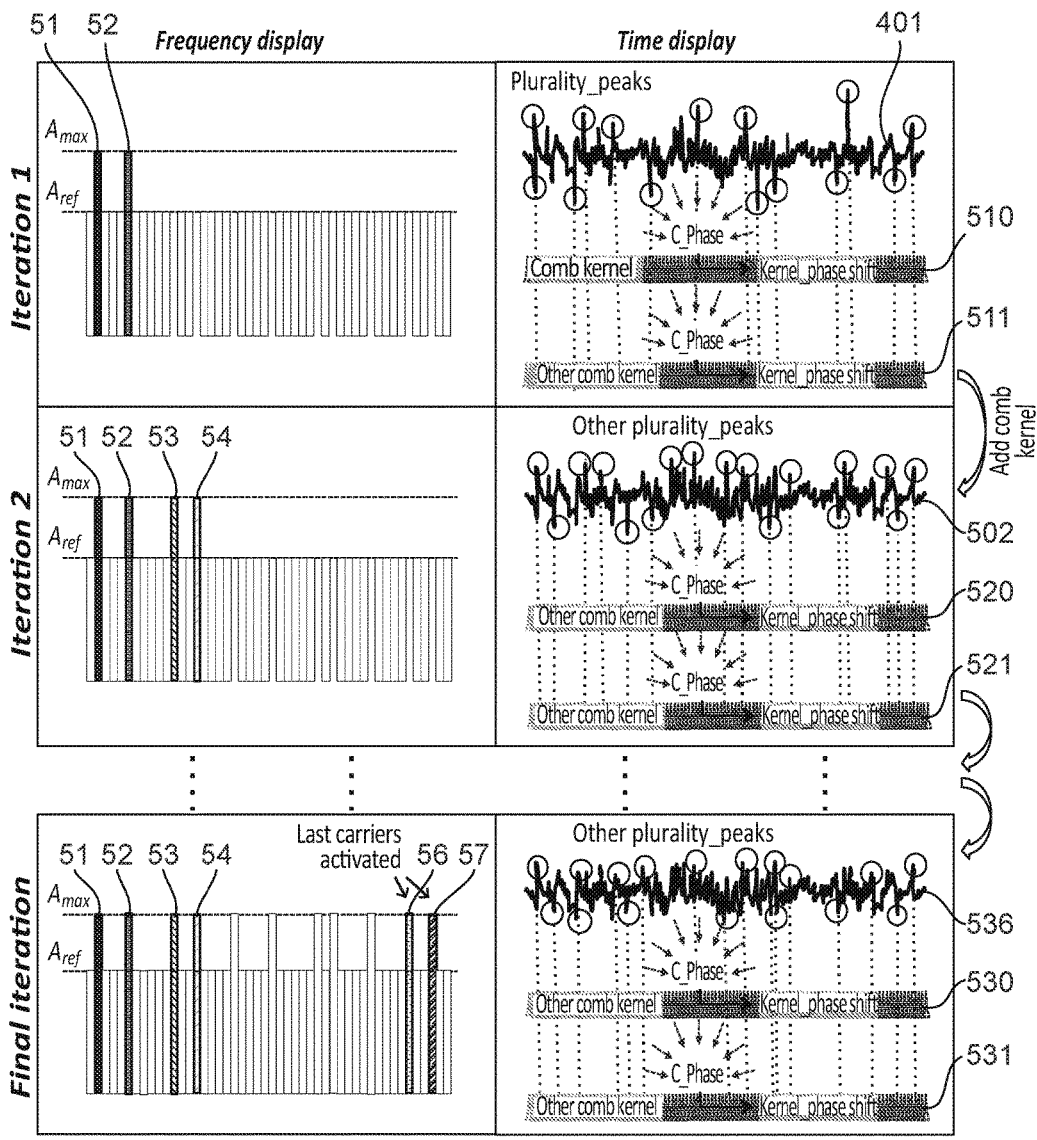
Figure 7:
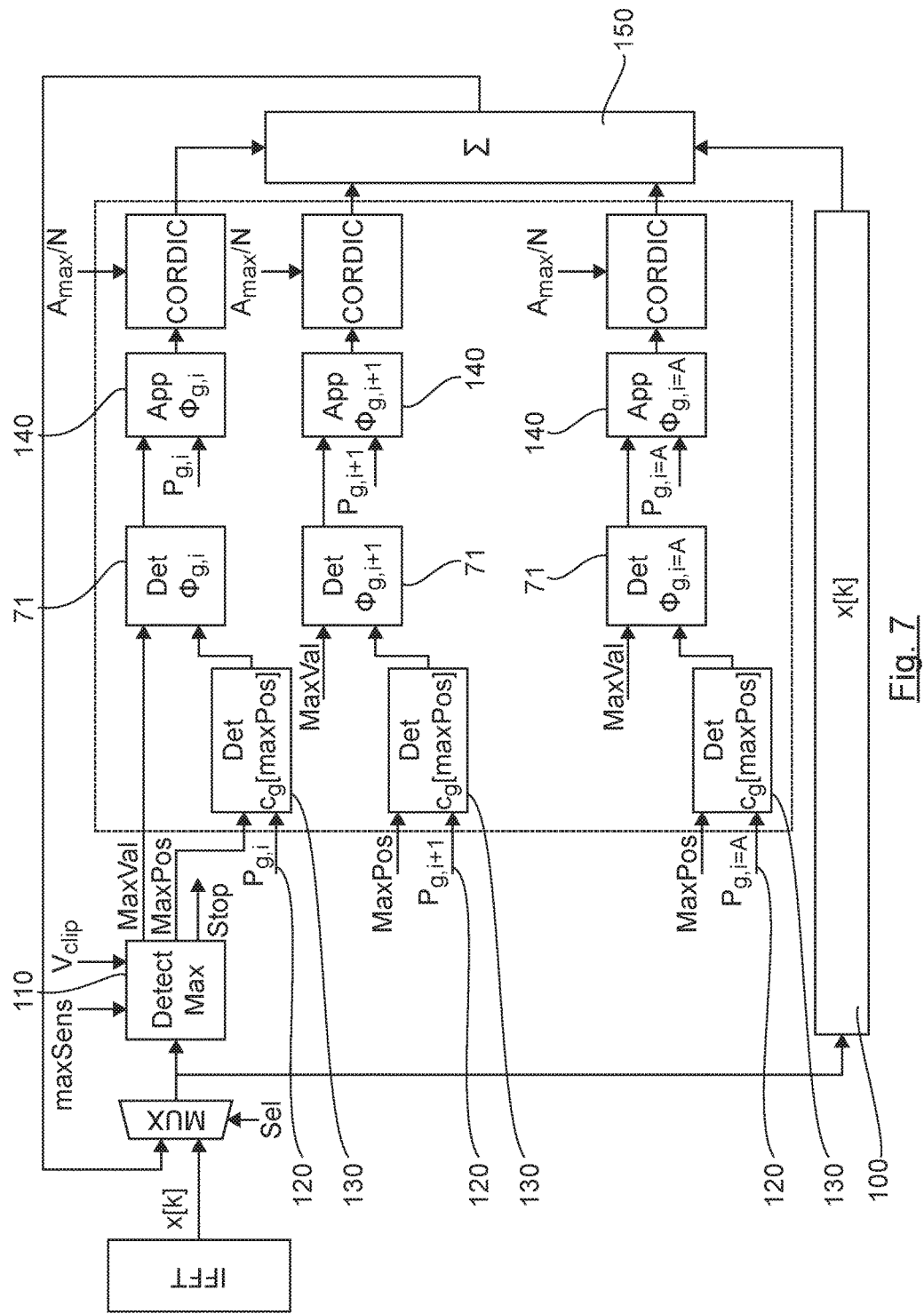

5.3.1 First Variant:

Referring to FIGS. 6 and 7, we present a first variant of this second embodiment of the invention that the inventors have named "grouped solo TR".

According to this first variant, a step (71) for determining phase shift is implemented by the phase-shift entity shown in FIG. 7, illustrating the device corresponding, for one iteration, to this first variant of the second embodiment, the modules and entities of which are driven by a processor (not shown) of a processing unit (not shown), itself driven by a computer program (not shown) stored in a memory (not shown) and implementing the method of transmission according to the invention.

In other words, according to this particular aspect, for each carrier activated during the iteration considered, a step (71) for determining the phase shift is implemented. There are therefore as many phase-shift determining steps (71) (and therefore the corresponding determining entities) as the number A of carriers activated per iteration.

FIG. 6 especially illustrates the case where two reserved carriers are activated per iteration giving A=2, respectively the reserved carriers 51 and 52 for the first iteration, the carriers 53 and 54 for the second iteration, the reserved carriers 56 and 57 for the last iteration.

Thus, if we consider the 8 K mode with N=72 reserved carriers, there will therefore be G=36 groups of two activated carriers per iteration and therefore 36 iterations will be implemented, against 72 according to the first embodiment described here above.

FIG. 7 especially illustrates the case where more than three reserved carriers are activated per iteration, giving A>3. Such an embodiment with three to six carriers activated per iteration would make it possible especially to process a symbol according to the 32 K mode introduced into the DVB-T2 standard where N=288 reserved carriers, with respectively G=96 or G=48 iterations, thus efficiently reducing the time taken to implement the method according to the invention.

Just as for the first embodiment, in this second embodiment, the M time samples (401) representing the symbol considered are first of all obtained 10 and memorized, and P peaks are detected 11 as encircled in the time display of the first iteration of FIG. 6.

During the first iteration of this first variant of this second embodiment, the first two reserved carriers $P_{g=1,i=1}$ and $P_{g=1,i=2}$ referenced 51, 52 are activated (12) by addition of a pre-determined power value defined by an operator.

Then, the M time samples 510 representing the first activated reserved carrier 51 and the M time samples 520 representing the second activated reserved carrier 52 are obtained (13) in parallel by the respective obtaining entities 130 of FIG. 7, in assuming that, for each of these activated reserved carriers, all the other carriers are set at zero and take the form of distinct impulse combs that differ from the single time impulse-like kernel, implemented according to the prior-art TR techniques as illustrated in FIGS. 1 and 2.

Then, these impulse combs 510 and 512 are phase-shifted separately in parallel (14) so that each coincides in position and in inverse amplitude (i.e. amplitude in opposition to the amplitude of each peak) with the previously detected peaks 11 among the M time samples 401.

To this end, the respective phase shifts are determined (71) in parallel as follows:

$$\phi_{g=1,i=1} = \frac{3\pi}{2} + \arctan\left(\frac{\sum_{v \in maxPos} \text{Re}(x_{g=1}[v]) \cdot \text{Re}(c_{g=1,i=1}[v]) + \text{Im}(x_{g=1}[v]) \cdot \text{Im}(c_{g=1,i=1}[v])}{\sum_{v \in maxPos} \text{Im}(x_{g=1}[v]) \cdot \text{Re}(c_{g=1,i=1}[v]) - \text{Re}(x_{g=1}[v]) \cdot \text{Im}(c_{g=1,i=1}[v])}\right)$$

$$\phi_{g=1,i=2} = \frac{3\pi}{2} + \arctan\left(\frac{\sum_{v \in maxPos} \text{Re}(x_{g=1}[v]) \cdot \text{Re}(c_{g=1,i=2}[v]) + \text{Im}(x_{g=1}[v]) \cdot \text{Im}(c_{g=1,i=2}[v])}{\sum_{v \in maxPos} \text{Im}(x_{g=1}[v]) \cdot \text{Re}(c_{g=1,i=2}[v]) - \text{Re}(x_{g=1}[v]) \cdot \text{Im}(c_{g=1,i=2}[v])}\right)$$

$x_{g=1}$ is a time vector comprising the M samples (401) representing the symbol at the first iteration (g=1),
maxPos represents all the positions of the P samples detected and v is one of said positions during the first iteration (g=1),
$c_{g=1,i=1}$ is a time vector comprising the M samples (510) representing said first reserved carrier 51 activated during this first iteration (g=1) such that:

$$c_{g=1,i=1}[k] = \frac{A_{max}}{M} \cdot e^{j\frac{2\pi \cdot P_{g=1,i=1} \cdot k}{M}}, k \in [0, M-1]$$

with:
$P_{g=1,i=1}$ being the position of the first reserved carrier 51 activated during this first iteration,
$c_{g=1,i=2}$ a time vector comprising the M samples (520) representing said second reserved carrier 52 activated during this first iteration (g=1), such that:

$$c_{g=1,i=2}[k] = \frac{A_{max}}{M} \cdot e^{j\frac{2\pi \cdot P_{g=1,i=2} \cdot k}{M}}, k \in [0, M-1]$$

with:
$P_{g=1,i=2}$ being the position of the second reserved carrier 52 activated during this first iteration.

Then the two time impulse combs 510 and 520 corresponding to these two activated carriers are phase-shifted (14) in parallel as follows:

$$c_{g=1,i=1}[k]_d = \frac{A_{max}}{M} \cdot e^{-j\phi_{g=1,i=1}} \cdot e^{j\frac{2\pi \cdot P_{g=1,i=1} \cdot k}{M}}, k \in [0, M-1],$$

$$c_{g=1,i=2}[k]_d = \frac{A_{max}}{M} \cdot e^{-j\phi_{g=1,i=2}} \cdot e^{j\frac{2\pi \cdot P_{g=1,i=2} \cdot k}{M}}, k \in [0, M-1]$$

Once these impulse combs are phase-shifted (they are also called phase-shifted "comb kernels"), they are both added, by the addition entity 150 of FIG. 7, to the M time samples 401 representing the symbol considered, delivering M new time samples $x_{g=2}[k]$ 502 representing the symbol to be used for the detection step 11 of the second iteration such that:

$$x_{g=2}[k] = x_{g=1}[k] + c_{g=1,i=1}[k]_d + c_{g=1,i=2}[k]_d \text{ or again } x_{g=2}[k] = x_{g=1}[k] + \tau_{i \in A} c_{g,i'}$$

and so on and so forth until the last two reserved carriers 56 and 57 which have not yet been activated.

It can be noted that, because of the addition of these two combs 510 and 520 instead of one comb according to the first embodiment, the reduction of the PAPR is accelerated by iteration. Indeed the amplitude of the M new time-sample peaks $x_{g=2}[k]$ 502 of the second iteration of FIG. 6 is smaller than the amplitude of the M new time-sample peaks $x_{g=2}[k]$ 502 of the second iteration of FIG. 4 of the first embodiment.

Figure 8:
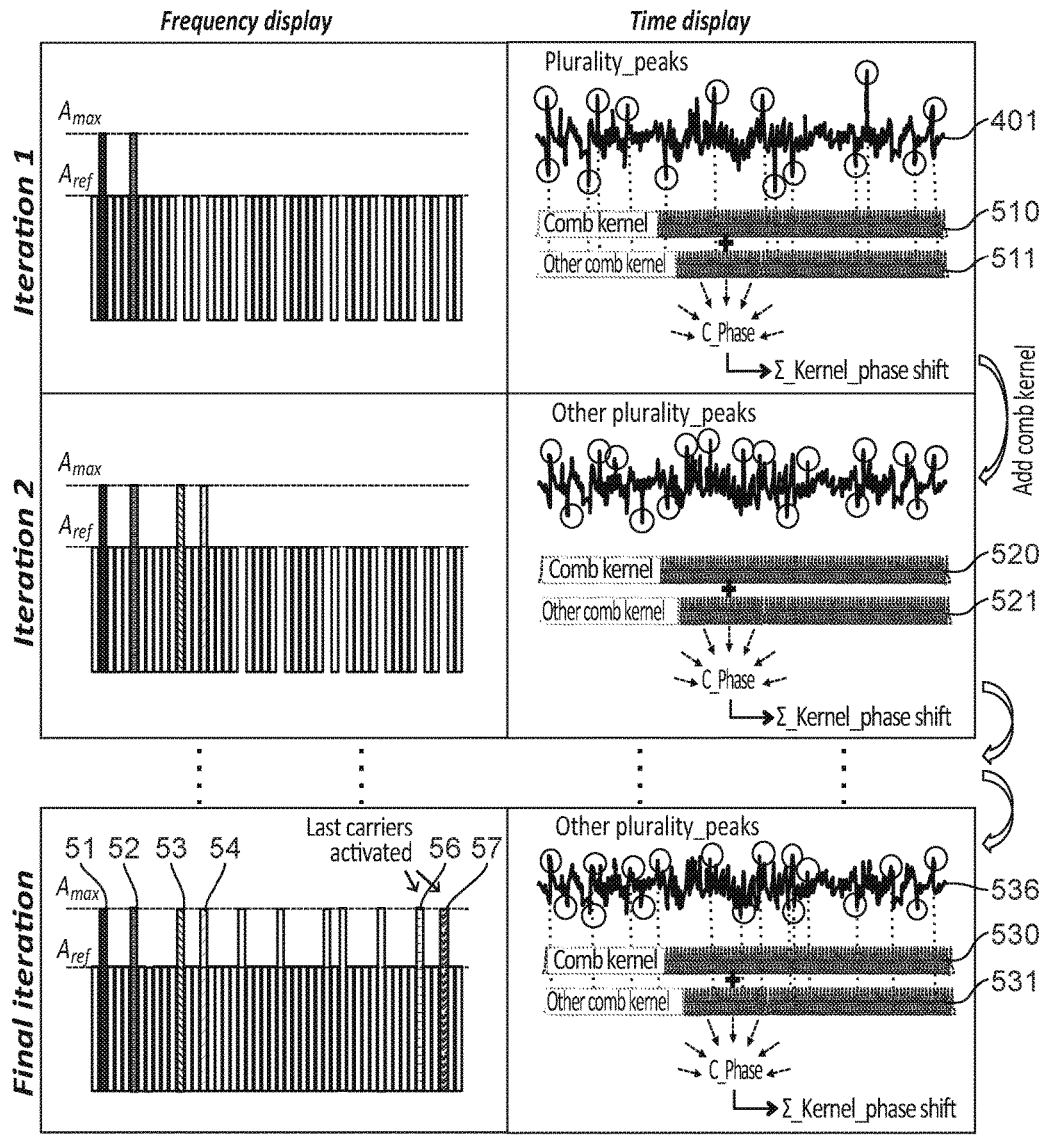
Figure 9:
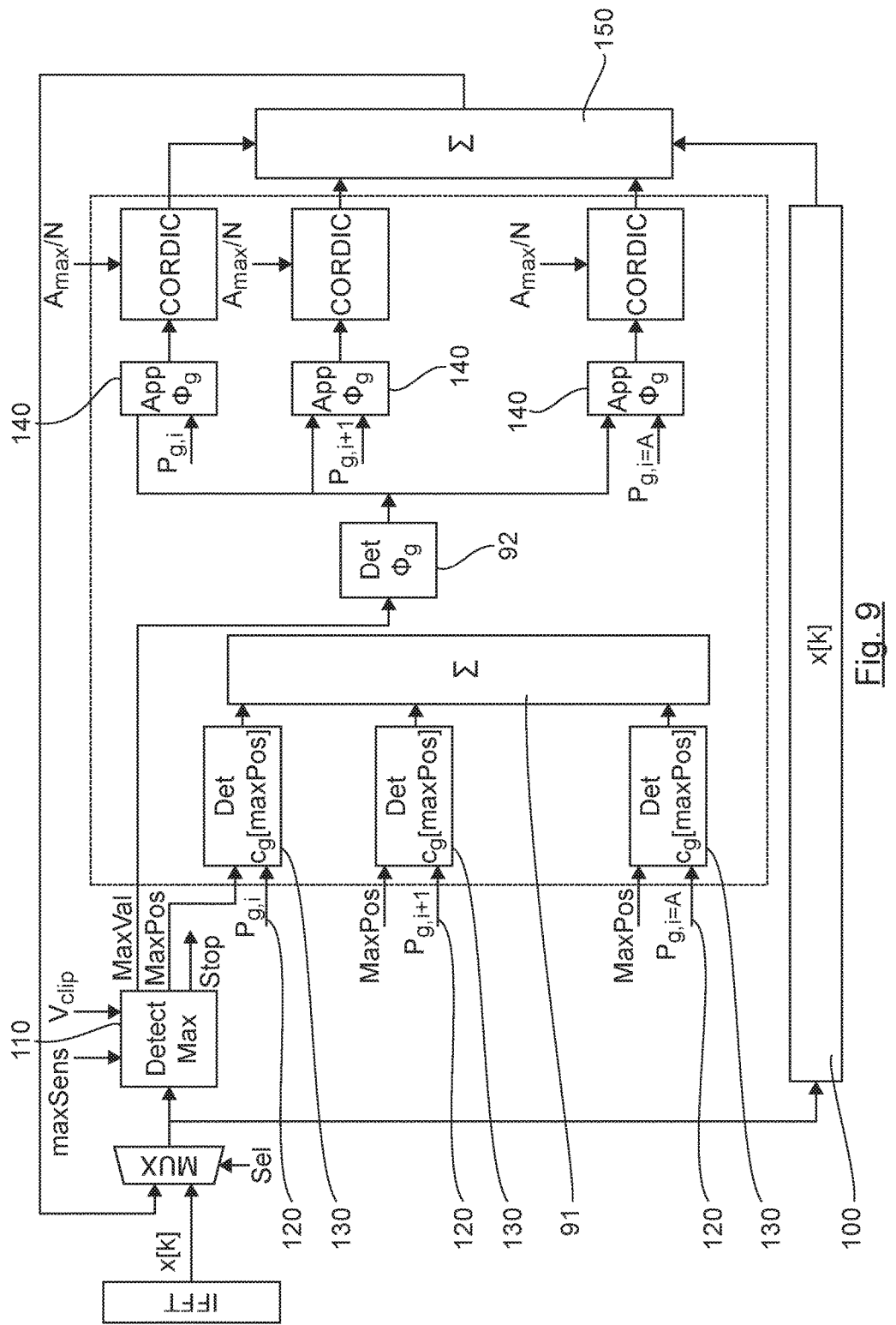

5.3.2 Second Variant:

Referring to FIGS. 8 and 9, we present a second variant of this second embodiment of the invention that the inventors have named "grouped solo TR".

This second embodiment seeks to reduce the number of resources implemented during the step for determining the phase shift (71) implemented by activated reserved carrier according to the first variant.

Indeed, this step requires that there should be as many phase-determining entities as there are reserved carriers activated per iteration.

To this end, this second variant of the second embodiment of the invention proposes a "factorizing" of the phase-shift determining step as illustrated by FIG. 9 illustrating the device corresponding, for one iteration, to this second variant of the second embodiment, the modules and entities of which are driven by a processor (not shown) of a processing unit (not shown), itself driven by a computer program (not shown) stored in a memory (not shown) and implementing the method of transmission according to the invention.

Thus, a single step (92) for determining said phase shift is implemented for said at least two simultaneously activated reserved carriers.

To achieve this, this phase-shift determining step is preceded by a step of addition (91) of the M time samples obtained respectively for each of said at least two simultaneously activated reserved carriers.

Thus, A-1 phase-shift determining entities, each comprising four multipliers and two adders/subtractors, are replaced by one adder implementing the step of addition 91 illustrated in FIG. 9.

In other words, according to this particular aspect, the three steps for obtaining (13), applying (14) and adding (15) are respectively implemented for each activated reserved carrier. However, a same phase-shift value is applied to each.

Just as in the case of the first embodiment, in this second embodiment, the M time samples (401) representing the symbol considered are all first of all obtained 10 and memorized and P peaks are detected 11 as encircled in the time display of the first iteration of FIG. 8.

During the first iteration of this first variant of this second embodiment, the first two reserved carriers $P_{g=1,i=1}$ and $P_{g=1,i=2}$ referenced 51, 52, are activated (12) by the addition of a pre-determined power value defined by an operator.

Then, the M time samples 510 representing the first activated reserved carrier 51 and the M time samples 520 reserving the second activated reserved carrier 52 are obtained (13) in parallel by the respective obtaining entities 130 of FIG. 9 in assuming, for each of these activated reserved carriers, that all the other carriers are set at zero and take the form of distinct impulse combs that differ from the single time impulse-like kernel implemented according to the TR techniques of the prior art as illustrated in FIGS. 1 and 2.

Then the time pulse combs 510 and 512 are added (91) such that:

$$c_{g,s} = c_{g=1,i=1}[k] + c_{g=1,i=2}[k] \text{ or again } c_{g,s} = \tau_{i \in A} c_{g,i}$$

and a single phase shift is determined (93) as follows:

$$\phi_{g,s} = \frac{3\pi}{2} + \arctan\left(\frac{\sum_{v \in maxPos} \text{Re}(x_{g=1}[v]) \cdot \text{Re}(c_{g,s}[v]) + \text{Im}(x_{g=1}[v]) \cdot \text{Im}(c_{g,s}[v])}{\sum_{v \in maxPos} \text{Im}(x_{g=1}[v]) \cdot \text{Re}(c_{g,s}[v]) - \text{Re}(x_{g=1}[v]) \cdot \text{Im}(c_{g,s}[v])}\right)$$

with:

$x_{g=1}$ being a time vector comprising the M samples (401) representing the symbol during the first iteration (g=1), maxPos the set of the positions of the P samples detected and v one of said positions during the first iteration (g=1).

Then, the two time impulse combs 510 and 520 corresponding to these two activated carriers are phase-shifted (14) in parallel as follows:

$$c_{g=1,i=1}[k]_d = \frac{A_{max}}{M} \cdot e^{-j\phi_{g,s}} \cdot e^{j\frac{2\pi \cdot P_{g=1,i=1} \cdot k}{M}}, k \in [0, M-1],$$

$$c_{g=1,i=2}[k]_d = \frac{A_{max}}{M} \cdot e^{-j\phi_{g,s}} \cdot e^{j\frac{2\pi \cdot P_{g=1,i=2} \cdot k}{M}}, k \in [0, M-1]$$

Once these impulse combs are phase-shifted (they are also called phase-shifted "comb kernels"), they are both added, by the addition entity 150 of FIG. 9, to the M time samples 401 representing the symbol considered, delivering M new time samples $x_{g=2}[k]$ 502 representing the symbol to be used for the detection step 11 of the second iteration such that:

$x_{g=2}[k] = x_{g=1}[k] + c_{g=1,i=1}[k]_d + c_{g=1,i=2}[k]_d$ or again $x_{g=2}[k] = x_{g=1}[k] + \tau_{i \in A} c_{g,i_d}$ and so on and so forth until the last two reserved carriers 56 and 57 which have not yet been activated.

The invention claimed is:

1. A method of transmission of a multi-carrier source signal, comprising symbols constituted by a set of carriers, intended to be sent out simultaneously and comprising carriers reserved for at least one processing operation for reducing a peak-to-average power ratio of said source signal, and data carriers, said method comprising the following acts:
generation of an additional signal and addition to said source signal of said additional signal, delivering an optimized signal having a peak-to-average power ratio smaller than the peak-to-average power ratio of said source signal, and
transmission of said optimized signal,
wherein said act of generation and addition of said additional signal comprises, for each symbol of said source signal, an act of obtaining a number M of time samples representing said symbols and at least one iteration of the following acts:
detection of a number of P time samples from among said M time samples representing said symbol, said P samples being the P samples of the highest amplitude among said M time samples, or said P time samples presenting a power value above a pre-determined threshold,
in the frequency domain, activation of at least one of said reserved carriers of said symbol, by the addition of a pre-determined power to said at least one of said reserved carriers, and
for each activated reserved carrier:
obtaining M time samples representing said activated reserved carrier,
applying a phase shift, taking account of said P detected samples, to said M time samples representing said activated reserved carrier, delivering M time samples representing an additional signal associated with said activated reserved carrier, and
adding the M time samples representing said additional signal associated with said activated reserved carrier to said M time samples representing said symbol, delivering M time samples representing said symbol to be used for the detection act of the next iteration.

2. The method of transmission according to claim 1, wherein each reserved carrier is activated only once during said act of generating an additional signal.

3. The method of transmission according to claim 1, wherein said phase shift takes account, at the same time, of the amplitude of said P detected samples and of the amplitude of P samples having a same position as said detected P samples and belonging to said M time samples representing said at least one activated reserved carrier.

4. The method of transmission according to claim 3, wherein said phase shift is defined by the following equation in the discrete time domain:

$$\phi = \frac{3\pi}{2} + \arctan\left(\frac{\sum_{v \in maxPos} \text{Re}(x[v]) \cdot \text{Re}(c[v]) + \text{Im}(x[v]) \cdot \text{Im}(c[v])}{\sum_{v \in maxPos} \text{Im}(x[v]) \cdot \text{Re}(c[v]) - \text{Re}(x[v]) \cdot \text{Im}(c[v])}\right)$$

with:
x being a time vector comprising the M samples representing said symbol,
maxPos all the positions of said P detected samples and v one of said positions,
c a time vector comprising said M samples representing said activated reserved carrier.

5. The method of transmission according to claim 1, wherein at least two reserved carriers of said symbol are activated simultaneously.

6. The method of transmission according to claim 5, comprising an act of determining a phase shift, which is implemented for each of said at least two simultaneously activated reserved carriers.

7. The method of transmission according to claim 5, wherein a single act of determining said phase shift is implemented for said at least two simultaneously activated reserved carriers,
said act determining said phase shift being preceded by an act of adding M time samples obtained respectively for each of said at least two simultaneously activated reserved carriers.

8. A device for transmitting a multi-carrier source signal comprising symbols constituted by a set of carriers that are to be sent out simultaneously, and comprising carriers reserved for at least one processing operation to reduce a peak-to-average power ratio of said source signal, and data carriers, said device comprising:
a processor; and
a non-transitory computer-readable medium comprising instructions stored thereon, which when executed by the processor configure the device to perform acts comprising:
generation of an additional signal and addition to said source signal of said additional signal, delivering an optimized signal having a peak-to-average power ratio smaller than the peak-to-average power ratio of said source signal, and transmission of said optimized signal, wherein said generation and addition of said additional signal comprises, for each symbol of said source signal, obtaining a number M of time samples representing said symbol, and further comprises:

detecting a number P of time samples among said M time samples representing said symbol, said P samples being the P samples of highest amplitude among said M samples, or said P samples having power above a pre-determined threshold, activating at least one of said reserved carriers of said symbol, by addition of a pre-determined power value to said at least one of said reserved carriers, and for each activated reserved carrier:

obtaining M time samples representing said activated reserved carrier, applying a phase shift, taking account of said P detected samples, to said M time samples representing said activated reserved carrier, delivering M time samples representing an additional signal associated with said activated reserved carrier, and adding M time samples, representing said additional signal associated with said activated reserved carrier, to said M time samples representing said symbol, delivering M time samples representing said symbol to be used for the detection step of the following iteration.

9. A non-transitory computer-readable medium comprising a computer program product stored thereon, which comprises program code instructions for implementing a method of transmission of a multi-carrier source signal, when the instructions are executed by a processor of a transmission device, wherein the multi-carrier source signal comprises symbols constituted by a set of carriers, intended to be sent out simultaneously and comprising carriers reserved for at least one processing operation for reducing a peak-to-average power ratio of said source signal, and data carriers, and wherein the instructions configure the transmission device to perform acts comprising:

generation of an additional signal and addition to said source signal of said additional signal, delivering an optimized signal having a peak-to-average power ratio smaller than the peak-to-average power ratio of said source signal, and transmission of said optimized signal, wherein said act of generation and addition of said additional signal comprises, for each symbol of said source signal, an act of obtaining a number M of time samples representing said symbols and at least one iteration of the following acts:

detection of a number P of time samples from among said M time samples representing said symbol, said P samples being the P samples of the highest amplitude among said M samples, or said P samples presenting a power value above a pre-determined threshold, in the frequency domain, activation of at least one of said reserved carriers of said symbol, by the addition of a pre-determined power to said at least one of said reserved carriers, and for each activated reserved carrier:

obtaining M time samples representing said activated reserved carrier, applying a phase shift, taking account of said P detected samples, to said M time samples representing said activated reserved carrier, delivering M time samples representing an additional signal associated with said activated reserved carrier, and adding the M time samples representing said additional signal associated with said activated reserved carrier to said M time samples representing said symbol, delivering M time samples representing said symbol to be used for the detection act of the next iteration.

\* \* \* \* \*